US010691261B2

(12) United States Patent
Lee et al.

(10) Patent No.: US 10,691,261 B2
(45) Date of Patent: Jun. 23, 2020

(54) NON-PLANAR REFLECTIVE FOLDED OPTICS

(75) Inventors: Sai Mun Lee, Penang (MY); Lye Pin Chu, Kuala Lumepur (MY); Kai Jean Tee, Penang (MY)

(73) Assignee: PIXART IMAGING INC., Hsin-Chu (TW)

( * ) Notice: Subject to any disclaimer, the term of this patent is extended or adjusted under 35 U.S.C. 154(b) by 292 days.

(21) Appl. No.: 13/009,669

(22) Filed: Jan. 19, 2011

(65) Prior Publication Data

US 2012/0182264 A1 Jul. 19, 2012

(51) Int. Cl.
*G06F 3/042* (2006.01)
(52) U.S. Cl.
CPC .................... *G06F 3/042* (2013.01)
(58) Field of Classification Search
USPC ............... 345/156, 158, 124, 6, 8; 359/831
See application file for complete search history.

(56) References Cited

U.S. PATENT DOCUMENTS

| 6,969,176 | B2 | 11/2005 | Pohle |
| 7,244,925 | B2 | 7/2007 | Xie |
| 7,855,843 | B2 | 12/2010 | Smity |
| 2003/0019934 | A1* | 1/2003 | Hunter et al. ............. 235/462.2 |
| 2004/0208348 | A1* | 10/2004 | Baharav et al. ............. 382/124 |
| 2005/0243055 | A1* | 11/2005 | Ranta et al. .................. 345/156 |
| 2006/0158751 | A1* | 7/2006 | McClurg et al. ............. 359/831 |
| 2007/0291164 | A1 | 12/2007 | Goh et al. |
| 2009/0201594 | A1 | 8/2009 | Smith |
| 2010/0079408 | A1 | 4/2010 | Leong et al. |
| 2010/0214224 | A1 | 8/2010 | Dolfi |
| 2010/0289775 | A1 | 11/2010 | Lee et al. |
| 2010/0302208 | A1 | 12/2010 | Brosnan et al. |
| 2010/0322550 | A1* | 12/2010 | Trott .............................. 385/12 |
| 2012/0098792 | A1* | 4/2012 | Lum et al. ..................... 345/175 |
| 2012/0105325 | A1* | 5/2012 | Brosnan et al. ............. 345/158 |
| 2012/0181419 | A1* | 7/2012 | Momtahan .................... 250/221 |

OTHER PUBLICATIONS

Lee, et al., "U.S. Appl. No. 13/009,669", *Non-Planar Reflective Folded Optics* filed Jan. 19, 2011 20 pages Jan. 19, 2011, 20.

* cited by examiner

*Primary Examiner* — Tony O Davis
(74) *Attorney, Agent, or Firm* — Li & Cai Intellectual Property (USA) Office

(57) ABSTRACT

An optical sensor assembly is disclosed. The optical sensor assembly includes a folded optical system that utilizes one or more non-planar reflective surfaces that enable the manipulation or conditioning of the overall thickness of the sensor assembly, the field of view of the sensor assembly, and the image size, either independently or in combination.

11 Claims, 6 Drawing Sheets

NON-PLANAR REFLECTIVE FOLDED OPTICS

FIELD OF THE DISCLOSURE

The present disclosure is generally directed toward optics and more specifically toward optical navigation devices.

BACKGROUND

Some electronic devices, such as cellular phones and smart phones, have menus or graphical user interfaces that are rather complex. In order to navigate through these menus, a user may move his finger over a navigator, which causes an icon associated with the menus to move. As electronic devices get smaller, the navigators must also get smaller so as not to limit the size of the electronic devices.

A key parameter in accomplishing a low profile Optical Finger Navigation (OFN) system is controlling the total vertical distance from the object to the image. One of the approaches used in prior solutions, is to fold the optical system with the use of two prisms.

In this approach, the field of view and/or the size of the image formed is limited by the vertical space (or thickness) of the prism. From another perspective, the lowest OFN system height achievable with such an approach is limited by the required field of view and/or image size requirements. Thus, prior solutions are self-constrained in their minimum allowable vertical height.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1:
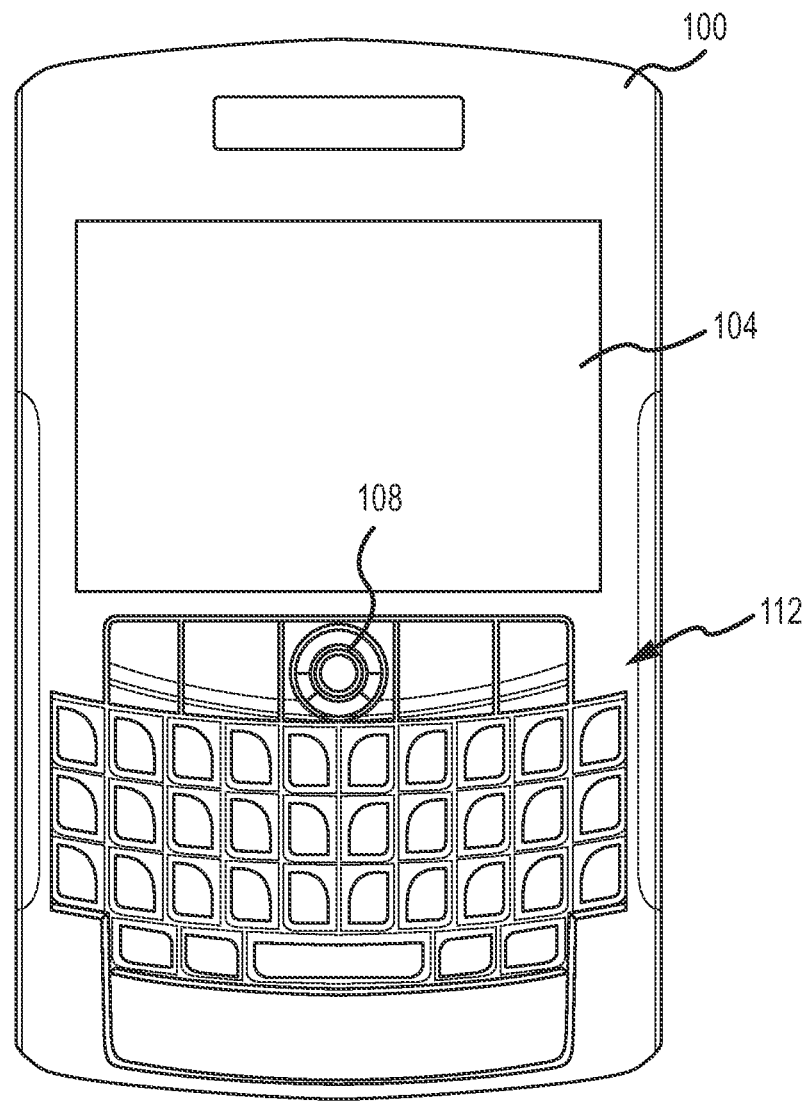
FIG. 1 is front view of a user device in accordance with embodiments of the present disclosure.

FIG. 1 shows an illustrative embodiment of a user device 100. The user device 100 may include a display screen 104, a touch input 108, and a keypad input 112. The display screen 104, touch input 108, and keypad input 112 may be collectively referred to as the user interface of the user device 100. The user interface of the user device 100 may comprise other components such as a microphone (for receiving audio user input), a speaker (for providing audio user output), a camera (for capturing image input), and buttons in addition to the keypad for controlling various other operations of the user device 100.

In some embodiments, the display screen 104 is purely a user output, meaning that the display screen 104 is not configured to receive user input. In some embodiments, the display screen 104 may comprise a touch-pad or similar dual user input/output device. In such embodiments, the touch input 108, or components thereof, may be incorporated into the user output 104 by virtue of the fact that the display screen 104 is also configured to detect user input in the form of touch and/or image data and convert the touch or image data to an electrical signal for processing by the user device 100. If the display screen 104 is configured as a touch-screen input, then it may not be necessary to provide the user device 100 with a separate touch input 108.

The touch input 108 may comprise an input device which can be manipulated by a user's finger, thumb, and/or hand. Alternatively, or in addition, the touch input 108 may be manipulated by a stylus or the like. In some embodiments, the touch input 108 is an optical-based user input that comprises an optical sensor assembly. A user can employ the touch input 108 to move an object, cursor, selection tool, pointer, or the like on the display screen 104. Thus, the touch input 108 provides one option for the user to interface with the user device 100. In some embodiments, a user's finger engages the touch input 108 and the x-y motion of the user's finger across the touch input 108 is converted to x-y input data. The x-y input data may be used to manipulate the object, cursor, selection tool, pointer, or the like around the display screen 104.

The keypad 112 provides another mechanism for receiving user input at the user device 100. The keypad 112 may correspond to any button or collection of buttons provided in any type of configuration. For example, the keypad 112 may correspond to a QWERTY keyboard, a derivative thereof, or alternatives for the same (e.g., a mobile version of a QWERTY keyboard, an alphabetic keyboard, or any keyboard used for a specific language). As another example, the keypad 112 may be configured as a dial-pad having buttons corresponding to 0-9 digits, a "#" key, and a "*" key. As another example, the keypad 112 may comprise a calculator input with buttons corresponding to 0-9 digits and one or more keys for performing mathematical operations. Combinations of the above-described keypad 112 configurations may also be implemented in accordance with embodiments of the present disclosure.

In some embodiments, the user device 100 corresponds to a mobile communication device; in particular, the user device 100 may correspond to a cellular phone, mobile phone, smart phone, or the like. Other types of suitable user devices 100 include, but are not limited to, computers, laptops, netbooks, telephones, typewriters with an electronic communication channel (e.g., Text Telephone (TTY)), or the like.

Figure 2:
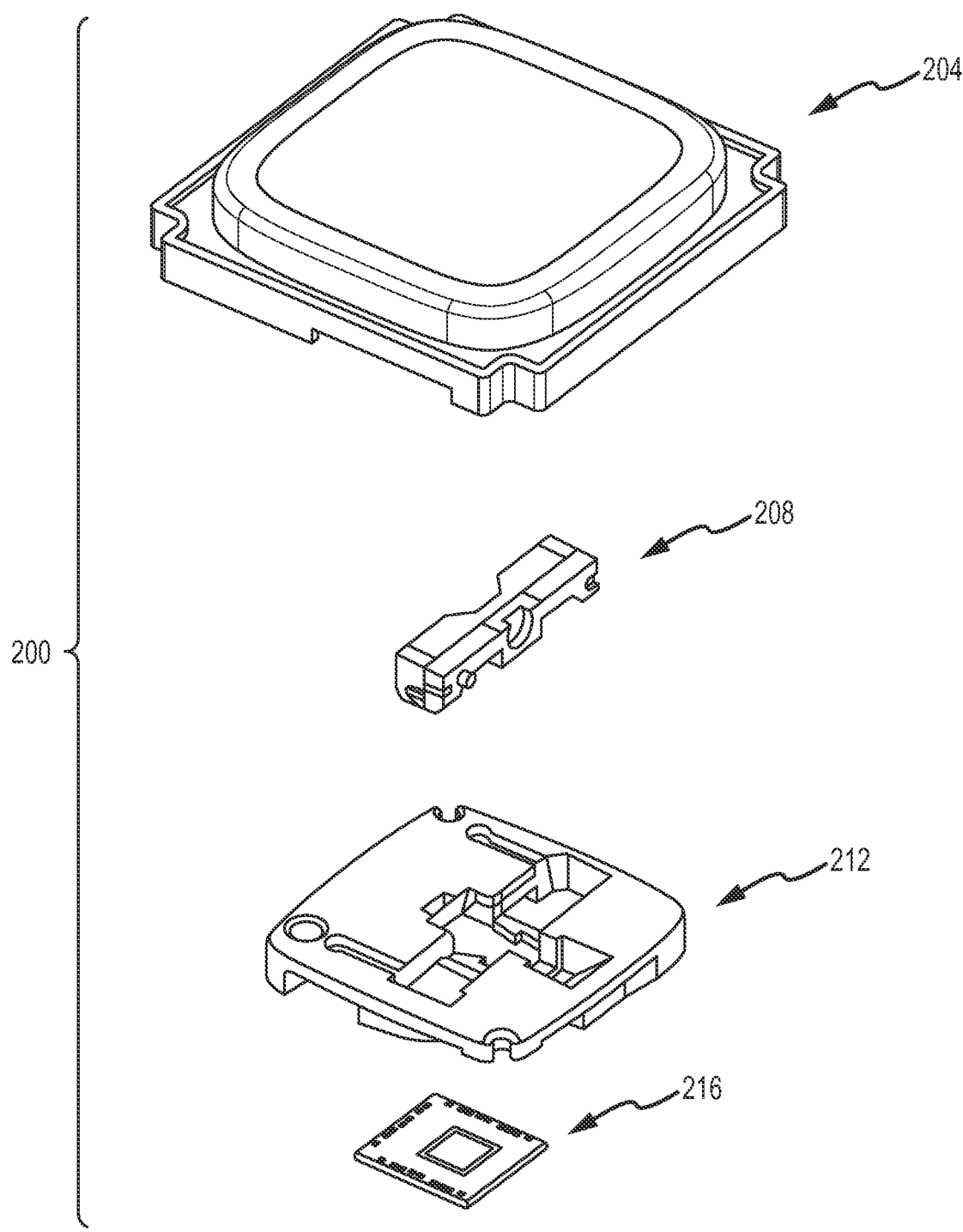
FIG. 2 is an exploded view of an optical sensor assembly in accordance with embodiments of the present disclosure.

Referring now to FIG. 2, details of an optical sensor assembly 200 which may be included in the touch input 108 will be described in accordance with embodiments of the present disclosure. The optical sensor assembly 200 may comprise a number of components including, without limitation, a cover 204, a lens and aperture assembly 208, a bracket 212, and a sensor 216. It should be appreciated that two or more of the individual components of the sensor assembly 200 may be combined into a single component without departing from the scope of the present disclosure.

The cover 204 may comprise a top major surface and an opposing bottom major surface. The top major surface of the cover 204 may be configured as a user interface. The bottom major surface of the cover 204 may have a cavity formed thereon for enclosing the other components of the optical sensor assembly 200. A window formed of plastic and/or glass may connect the top major surface to the bottom major surface, thereby allowing light to be transmitted from inside the cover 204 to the top major surface and further allowing light that is reflected off an object proximate top major surface to re-enter the cover 204.

It should be appreciated that the term "light" can encompass light that is in the visible and/or invisible spectrum. Additionally, the light may be coherent (i.e., laser light) or incoherent without departing from the scope of the present disclosure.

The bracket 212 may be adapted to receive the lens and aperture assembly 208. In some embodiments, the bracket 212 comprises a slot into which the lens and aperture assembly 208 slides and locks into place when the cover 204 is positioned over the bracket 212. The bracket 212 and/or cover 204 may also comprise one or more features that enable a friction fit or snap connection to be achieved between the bracket 212 and cover 204. Likewise, the lens and aperture assembly 208 and/or bracket 212 may comprise one or more features that enable a friction fit or snap connection to be achieved between the lens and aperture assembly 208 and bracket 212. Alternatively, or in addition, an adhesive may be used to connect the cover 204, bracket 212, and/or lens and aperture assembly 208.

The sensor 216 may be adapted to connect to the bottom of the bracket 212. In other words, the bracket 212 may separate the sensor 216 and cover 204. In some embodiments, the sensor 216 is configured as an LED-based optical sensor. Specifically, the sensor 216 may comprise one or more photodiodes for detecting light at the top major surface of the sensor 216. Where the sensor 216 comprises a plurality of photodiodes, the photodiodes may be configured in any type of known sensor array pattern. In some embodiments, the sensor 216 may comprise components which enable the sensor 216 to perform image processing tasks as well as other electronic blocks/algorithms that enable the sensor 216 to perform other signal processing tasks, comparison functions, mathematical operations, and the like.

To maintain a low-profile optical sensor assembly 200, the top major surface of the sensor 216 can be aligned substantially parallel to the top major surface of the cover 204. Furthermore, the bracket 212 may comprise a small cavity on its bottom surface for receiving the sensor 216. Like the other components of the optical sensor assembly 200, the bracket 212 and/or sensor 216 may comprise one or more features that enable a friction fit or snap connection to be achieved between the sensor 216 and bracket 212.

The various components of the optical sensor assembly 200 may be manufactured using any number of known manufacturing techniques. As one example, some or all of the components may be machined from a single piece of material. As another example, some or all of the components may be formed by an injection molding process. As yet another example, some or all of the components may comprise multiple pieces that are connected to one another using adhesives, external connection members, or the like. Combinations of the above manufacturing techniques may also be used to manufacture the various components of the optical sensor assembly 200. In some embodiments, the bracket 212 may be formed with an injection molding process whereas the cover 204 may be constructed of multiple parts (i.e., some portions of the cover 204 may be manufactured using injection molding whereas other portions like the window of the cover 204 may be separately manufactured and connected to the injection molded part of the cover 204). The lens and aperture assembly 208 may be constructed of two different parts, specifically, a glass or plastic lens may be separately formed and inserted into an aperture of the lens and aperture assembly 208. Any other suitable manufacturing technique can be employed without departing from the scope of the present disclosure.

Although not depicted, the optical sensor assembly 200 may also comprise a light source. The light source may be configured to fit within a cavity formed on the top surface of the bracket 212. The light source may also be configured to transmit light up through the cover 204 to the top major surface of the cover where it can be reflected off an object located proximate to the top major surface of the cover. The reflected light may then travel back through the cover 204, through the bracket 212, through the lens and aperture assembly 208, until it eventually reaches the sensor 216. The light received at the sensor 216 can be converted into an electrical signal and processed to determine motion of the object that interfaced with the top major surface of the cover 204. The determined motion of the object can then be converted into an x-y motion input or some other computer command to control one or more objects on the display screen 104 of the user device 100.

With reference now to FIGS. 3A, 3B, 4A, and 4B, further details of the optical sensor assembly 200 will be described in accordance with at least some embodiments of the present disclosure. The bracket 212 may comprise a first reflective surface 308a and a second reflective surface 308b. The lens and aperture assembly 208 may be configured to be inserted into the bracket 212, thereby optically separating the first reflective surface 308a and second reflective surface 308b. As discussed above, the lens and aperture assembly 208 may comprise a lens 312 which fits in between the first reflective surface 308a and second reflective surface 308b.

In some embodiments, one or both of the first and second reflective surfaces 308a, 308b are non-planar, which means that they have a radius curvature along at least one of their axes. Utilization of one or more non-planar reflective surfaces 308a and/or 308b can enable a lower assembly 200 height to be achieved. Also, it enables the manipulation or conditioning of the field of view and/or image height as desired. For example, a smaller assembly 200 height can be achieved without altering the required field of view and/or image size (which may be dictated by the size of the sensor array on the optical sensor 216). On the other hand, if the height of the assembly 200 is to remain fixed, a larger field of view and/or large image height can be achieved as compared to optical systems of the prior art having the same height. It is desirable to have a larger field of view at the object surface 304 and/or larger image size at the optical sensor 216 to increase the signal content of the system, thereby enhancing object tracking performance.

In some embodiments, the non-planar reflective surface 308a and/or 308b may be spherically configured, meaning that the radius of curvature in a first axis is equal to the radius of curvature in a second axis. In this spherical configuration, the first and second axes of the non-planar reflective surface 308a and/or 308b may be orthogonal, which means that the non-planar reflective surface 308a and/or 308b is a section of a sphere. If at least one of the non-planar reflective surfaces 308a and/or 308b are configured with a spherical curvature, then the thickness from the top major surface of the cover 304 (i.e., the object surface 304) to the top surface of the optical sensor 216 can be reduced from 0.85 mm (as was achievable in the prior art) to approximately 0.76 mm while simultaneously increasing the image size from 0.90 mm×0.90 mm to approximately 0.98 mm×0.98 mm. In other words, by utilizing a spherical configuration, the field of view at the object surface 304 can be approximately 0.90 mm×0.90 mm whereas the image size at the optical sensor 216 can be approximately 0.98 mm×0.98 mm.

In some embodiments, the non-planar reflective surface 308a and/or 308b may be bi-conically configured, meaning that the radius of curvature in a first axis is different from the radius of curvature in a second axis. In this bi-conical configuration, while there is a radius of curvature along either a first axis, a second axis, or both axes, the amount of curvature, if any, is different which means that the non-planar reflective surface 308a and/or 308b is a section of an oblong-shaped object or a cylindrical object. If at least one of the non-planar reflective surfaces 308a and/or 308b are configured with a bi-conical curvature, then the thickness from the object surface 304 to the top surface of the optical sensor 216 can still be reduced to approximately 0.76 mm while simultaneously increasing the image size from 0.90 mm×0.90 mm to approximately 0.98 mm×1.10 mm. In other words, by utilizing the bi-conical configuration, the field of view at the object surface 304 can be approximately 0.90 mm×0.90 mm whereas the image size at the optical sensor 216 can be approximately 0.98 mm×1.10 mm.

In some embodiments, the lens 312 may be off-axis relative to the optical sensor 216 and object surface 304. In other words, the lens 312 may be tilted such that it focuses light away from the top surface of the optical sensor 216 instead of parallel to the top surface of the optical sensor 216. The off-axis lens 312 enables the overall height of the optical sensor assembly 200 to be further reduced relative to prior art optical sensor systems. As can be appreciated, the direction in which the lens 312 is tilted may depend upon which reflective surface is non-planar. In the depicted embodiment, the second reflective surface 308b is non-planar whereas the first reflective surface 308a is planar. Thus, an upward tilt of the lens 312 helps to reduce the overall height of the optical sensor assembly 200. In embodiments where the first reflective surface 308a is non-planar and the second reflective surface 308b is planar, it may be advantageous to tilt the lens 312 downward instead of upward. In embodiments where both reflective surfaces 308a and 308b are non-planar, the lens 312 may be tilted either upward, downward, or be oriented without a tilt relative to the top surface of the optical sensor 216. The direction and amount of tilt in the lens 312 may vary according to system constraints and needs.

Figure 3A:
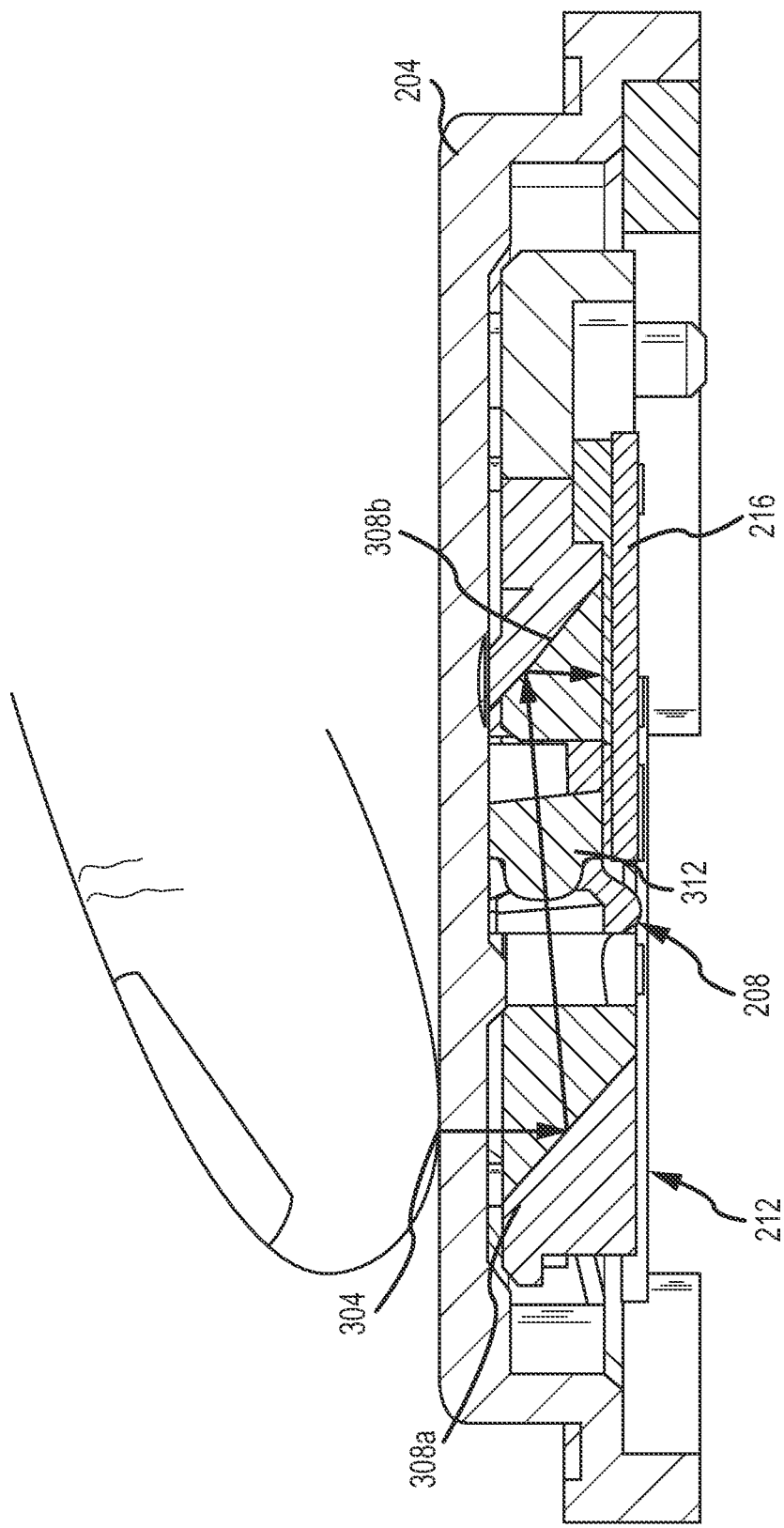
FIG. 3A is a cross-sectional view of an optical sensor assembly in accordance with embodiments of the present disclosure.
Figure 3B:
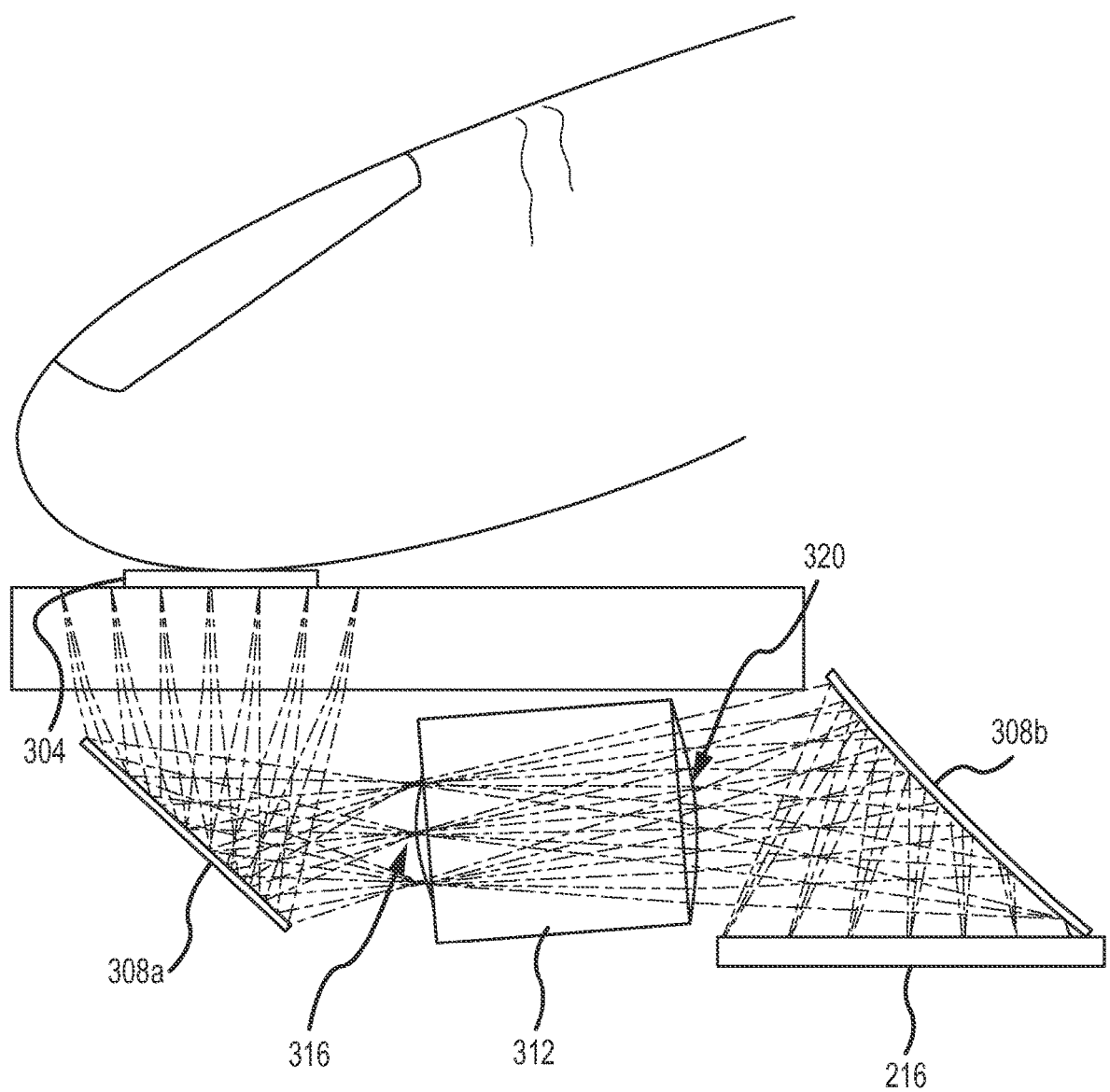
FIG. 3B is a cross-sectional schematic view of components in an optical sensor assembly in accordance with embodiments of the present disclosure.

As can be seen in FIG. 3B, the lens 312 may comprise a first side 316 for receiving light from the first reflective surface 308a and a second side 320 for transmitting light toward the second reflective surface 308b. One or both of the first and second sides 316, 320 of the lens 312 may have an optical feature for focusing or limiting light within the lens 312 and/or focusing or limiting light beyond the lens 312. In some embodiments, the first side 316 may comprise a convex surface and the second side 320 may comprise a convex surface. It should be appreciated, however, that concave or planar surfaces may also be utilized without departing from the scope of the present disclosure. The amount of curvature in the first side 316 as compared to the second side 320 may be the same or different, depending upon the amount of curvature in the non-planar reflective surface 308a and/or 308b and which of the reflective surfaces 308a, 308b is non-planar.

The lens 312 may be formed of any traditional lens material such as plastic (e.g., polycarbonate), glass, quartz, or combinations thereof. It may be formed by an injection molding process, micro-machining, or combinations thereof.

Figure 4A:
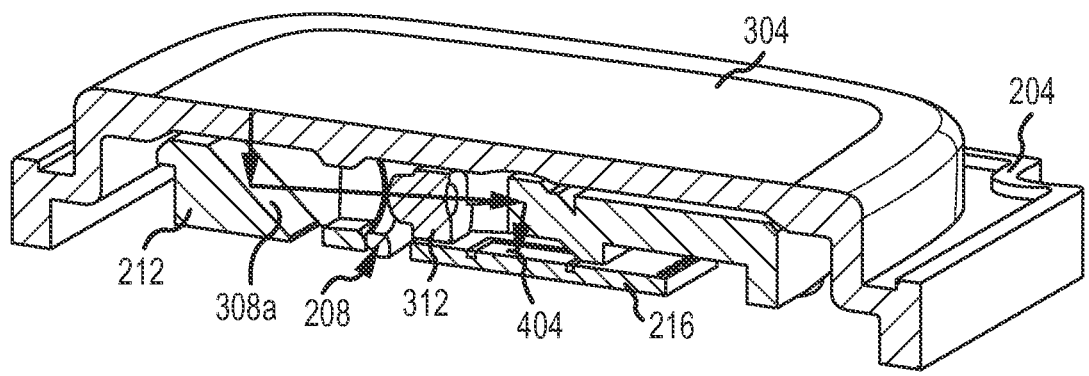
FIG. 4A is a cross-sectional top-right perspective view of an optical sensor assembly in accordance with embodiments of the present disclosure.
Figure 4B:
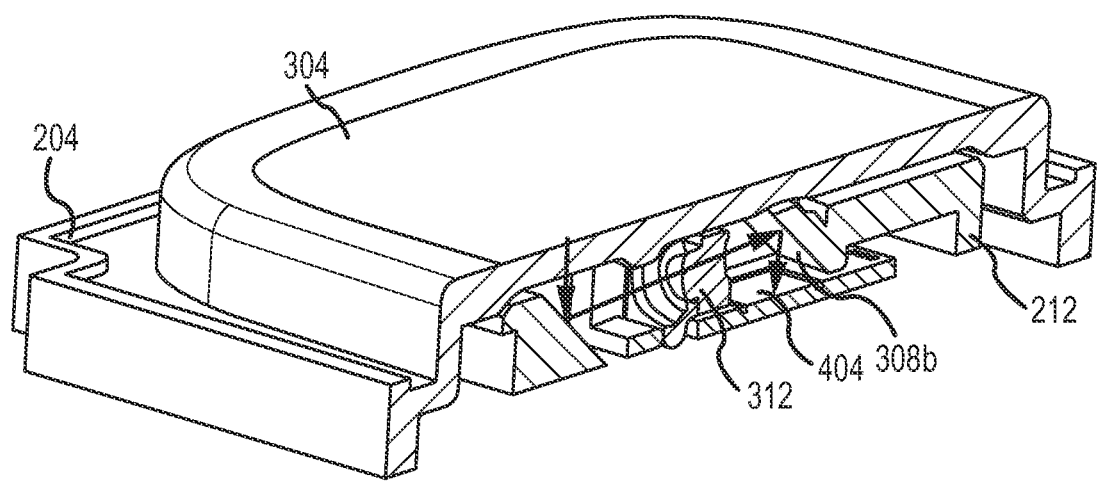
FIG. 4B is a cross-sectional top-left perspective view of an optical sensor assembly in accordance with embodiments of the present disclosure.

FIGS. 4A and 4B further depict the sensor area 404 that may be included on the top surface of the optical sensor 216. The size of the sensor area 404 can dictate the amount of curvature that is required of the non-planar reflective surface 308a and/or 308b, or vice versa. In some embodiments, because at least one non-planar reflective surface 308a and/or 308b is employed, the sensor area 404 can be increased if the overall height of the optical sensor assembly 200 remains the same, thereby allowing a larger image size to be achieved. A larger image size brings about several benefits. First, a larger image size enables better coverage of the sensor array, which reduces or eliminates dark regions on the sensor array that can lead to degraded tracking quality. Second, a larger image size enables a larger image array of the same pixel size to be achieved. For instance, a 19×19 @ 50 um sensor array can be used as compared to using a 15×15 @ 50 um sensor array. Third, larger pixels can be used to form a larger array. For example, a 15×15 @ 50 um sensor array can be used as compared to a 15×15 @ 30 um sensor array. As larger pixels inherently have larger photosensitive areas, the overall sensitivity of the optical sensor assembly 200 can be increased. It should be appreciated that the field of view and/or image height can also be reduced, if so desired.

As can also be seen in FIGS. 4A and 4B, the reflective surfaces 308a, 308b may be an integral part of the bracket 212. In other words, the bracket 212 may be formed in such a way that it includes both reflective surfaces 308a and 308b. In embodiments where the bracket 212 is formed of a plastic material, it may be necessary to cover the reflective surfaces 308a and 308b with a reflective material. In some embodiments, a reflective metal, metal alloy, or similarly reflective material may be deposited on selected areas of the bracket 212 to create the reflective surfaces 308a and 308b. Examples of suitable materials which may be added to the bracket 212 to create the reflective surfaces 308a and 308b include, without limitation, Al, Au, Ag, Ni, W, Pi, and/or Pt. The reflective material may be deposited on the bracket 212 using electroless or electro-plating techniques.

Although embodiments of the present disclosure have described the use of non-planar reflective surfaces 308a and/or 308b, those of ordinary skill in the optical arts will appreciate that the non-planar reflective surfaces 308a and/or 308b may be embodied in a folded imaging system configuration as a mirror, a prism, or a combination of the two. Thus, the bracket 212 may be constructed to have one or more integral prisms rather than one or more integral mirrors. Alternatively, the bracket 212 may be configured to receive one or more separate prisms that achieve the same optical characteristics as the non-planar reflective surfaces 308a and/or 308b.

Figure 5:
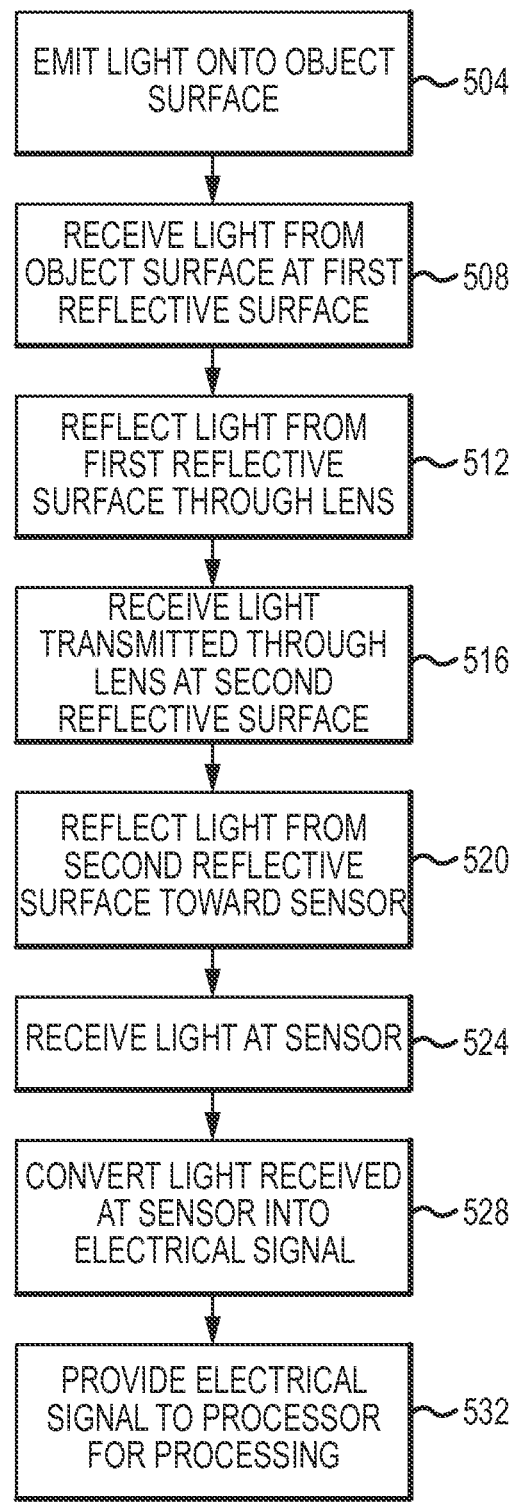
FIG. 5 is a flow diagram depicting a method of operating an optical sensor assembly in accordance with embodiments of the present disclosure.

With reference now to FIG. 5, a method of using an optical sensor assembly 200 with the user device 100 will be described in accordance with at least some embodiments of the present disclosure. The method is initiated by emitting light from a light source onto the object surface 304 (step 504). The light may be emitted by an LED, a plurality of LEDs not in an array, or array of LEDs which are housed within the cover 204. The light emitted by the light source through the window of the cover 204 may then be received at the object surface 304.

If an object is proximate to the object surface 304, then at least some of the emitted light is reflected back toward the cavity of the cover 204. This reflected light may be received at the first reflective surface 308a (step 508). The light received at the first reflective surface 308a is reflected through the lens 312 (step 512). As the light passes through the lens 312 it may be redirected by the curvatures in one or both sides of the lens 312. In some embodiments, the light is focused within the lens 312 and allowed to radiate as it exits the lens 312.

The light exiting the lens 312 then travels to the second reflective surface 308b (step 516) where it is subsequently reflected toward the optical sensor 216 (step 520). The light reflected by the second reflective surface 308b is then received at the light sensor 216 (step 524).

As discussed above, the light sensor 216 may comprise one or more elements that are capable of converting light energy into an electrical signal (step 528). One example of such a device is a photodiode or an array of photodiodes. The electrical signal may represent the intensity of light that is incident upon the sensor area 404 as well as the locations of such intensity. Specifically, the sensor area 404 may comprise a number of pixels and the output electrical signals may comprise signal intensities associated with each pixel in the sensor area 404. The electrical signals generated by the optical sensor 216 are then provided to a processor for subsequent processing (step 532). In some embodiments, the processor which processes the electrical signals received from the optical sensor assembly 200 may be located in the user device 100. In some embodiments, the processor may be in a device that is physically separated from the optical sensor assembly 200.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A folded optical imaging system, comprising:
an object surface;
an optical sensor;
a first optical element configured to receive light reflected from an object that is proximate to the object surface and reflect the light;
a second optical element configured to receive the light reflected by the first optical element and reflect the light reflected by the first optical element to the optical sensor, wherein the second optical element comprises a reflective convex surface for diverging the light reflected by the second optical element to the optical sensor; and
a third optical element positioned between the first optical element and the second optical element, wherein the third optical element comprises a lens that comprises at least one curved surface for focusing the light reflected by the first optical element to the second optical element, the lens is tilted relative to the optical sensor and the object surface, and tilt direction of the lens depends on whether the first optical element comprises a non-planar reflective surface for reflecting the light reflected from the object to the second optical element.

2. The system of claim 1, wherein the optical sensor comprises an array of photodiodes and wherein an image size at the array of photodiodes is larger than a field of view at the object surface.

3. The system of claim 1, wherein the reflective convex surface of the second optical element comprises a spherical mirror or a bi-conical mirror.

4. An optical sensor assembly, comprising:
a cover comprising an object surface;
an optical sensor;
a first optical element configured to receive light transmitted through the object surface and reflect the light;
a second optical element configured to receive the light reflected by the first optical element and reflect the light reflected by the first optical element to the optical sensor, wherein the second optical element comprises a reflective convex surface for diverging the light reflected by the second optical element to the optical sensor; and
a third optical element positioned between the first optical element and the second optical element, wherein the third optical element comprises a lens that comprises at least one curved surface for focusing the light reflected by the first optical element to the second optical element, the lens is tilted relative to the optical sensor and the object surface, and tilt direction of the lens depends on whether the first optical element comprises a non-planar reflective surface for reflecting the light transmitted through the object surface to the second optical element.

5. The assembly of claim 4, wherein a field of view at the object surface is smaller than an image size at the optical sensor.

6. The assembly of claim 4, wherein the first and second optical elements are integral to a bracket that is positioned within the cover.

7. The assembly of claim 6, wherein the bracket comprises an integral mirror to create at least one of the first and second optical elements.

8. The assembly of claim 6, wherein the bracket comprises a slot positioned between the first and second optical elements, the slot being configured to receive the third optical element.

9. A method of tracking object motion with an optical sensor assembly, the method comprising:
receiving light at a first optical element, the light received at the first optical element corresponding to light that has been reflected off an object;
reflecting the light with the first optical element toward a second optical element;
receiving the light reflected by the first optical element at the second optical element;
reflecting the light with the second optical element toward an optical sensor, wherein the second optical element comprises a reflective convex surface for diverging the light reflected by the second optical element to the optical sensor; and
receiving the light reflected by the second optical element at the optical sensor;

wherein the method further comprises:
focusing the light with a lens as the light travels from the first optical element to the second optical element, wherein the lens is tilted relative to the optical sensor and an object surface, and tilt direction of the lens depends on whether the first optical element comprises a non-planar reflective surface for reflecting the light reflected off the object to the second optical element.

10. The method of claim 9, further comprising:
converting the light received at the optical sensor into an electrical signal; and
processing the electrical signal with a processor.

11. The method of claim 9, wherein the light traveling through the lens is generally directed away from the optical sensor.

* * * * *